United States Patent
Nepogodin et al.

(10) Patent No.: US 12,455,950 B2
(45) Date of Patent: Oct. 28, 2025

(54) SYSTEM AND METHOD FOR ESTABLISHING BIOMETRIC HARDWIRED INFORMATION HANDLING SYSTEM (IHS) OWNERSHIP

(71) Applicant: Dell Products, L.P., Round Rock, TX (US)

(72) Inventors: Andrew Nepogodin, Round Rock, TX (US); Ching-Yun Chao, Austin, TX (US); Yun Zhang, Shanghai (CN); Jason Davidson, Albany, OR (US); Dominique Prunier, Montreal (CA); Elie Antoun Jreij, Pflugerville, TX (US); Sisir Samanta, Round Rock, TX (US); Bridget Cate, Taylors, SC (US)

(73) Assignee: Dell Products, L.P., Round Rock, TX (US)

( * ) Notice: Subject to any disclaimer, the term of this patent is extended or adjusted under 35 U.S.C. 154(b) by 120 days.

(21) Appl. No.: 18/340,938

(22) Filed: Jun. 26, 2023

(65) Prior Publication Data

US 2024/0427864 A1    Dec. 26, 2024

(51) Int. Cl.
 *G06F 21/32* (2013.01)
(52) U.S. Cl.
 CPC ................. *G06F 21/32* (2013.01)

(58) Field of Classification Search
None
See application file for complete search history.

(56) References Cited

U.S. PATENT DOCUMENTS

| | | | |
|---|---|---|---|
| 2006/0123240 A1* | 6/2006 | Chaiken | G06F 21/575 713/186 |
| 2013/0227266 A1* | 8/2013 | Beverly | G06F 9/4416 713/2 |
| 2021/0034791 A1* | 2/2021 | Singh | G06F 21/79 |
| 2021/0377013 A1* | 12/2021 | Lee | H04L 9/0869 |
| 2022/0405764 A1* | 12/2022 | Avetisov | G06Q 20/40145 |

* cited by examiner

*Primary Examiner* — Joshua Joo
(74) *Attorney, Agent, or Firm* — Fogarty LLP (57) ABSTRACT

Systems and methods for establishing biometric hardwired Information Handling System (IHS) ownership are described. In an illustrative, non-limiting embodiment, an IHS may include: a processor; a biometric module including a one-time write biometric profile; and a memory coupled to the processor, where the memory includes program instructions store thereon that, upon execution by the processor, cause the IHS to: obtain biometric data from a user of the IHS; and allow access to the IHS based, at least in part, on a validation of the biometric data with the biometric profile. In another embodiment, a method includes obtaining biometric data from a user of an IHS; and allowing access to the IHS based, at least in part, on a validation of the biometric data with a biometric profile stored in a one-time write memory of the IHS.

12 Claims, 3 Drawing Sheets

SYSTEM AND METHOD FOR ESTABLISHING BIOMETRIC HARDWIRED INFORMATION HANDLING SYSTEM (IHS) OWNERSHIP

FIELD

This disclosure relates generally to Information Handling Systems (IHSs), and more specifically, to systems and methods for establishing biometric hardwired IHS ownership.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for establishing biometric hardwired IHS ownership are described. In an illustrative, non-limiting embodiment, an Information Handling System (IHS) may include: a processor; a biometric module including a one-time write biometric profile; and a memory coupled to the processor, where the memory includes program instructions stored thereon that, upon execution by the processor, cause the IHS to: obtain biometric data from a user of the IHS; and allow access to the IHS based, at least in part, on a validation of the biometric data with the biometric profile.

In some embodiments, the biometric module includes a one-time flash memory write device. In some embodiments, the biometric profile is written to the one-time flash memory of the biometric module by a manufacturer of the IHS. In some embodiments, the biometric profile includes owner biometric data of an owner of the IHS. In some embodiments, the biometric profile is written to the one-time flash memory of the biometric module prior to providing the IHS to the owner. In some embodiments, the biometric module includes an immutable, read-only memory that cannot be reprogrammed.

In some embodiments, ownership of the IHS is transferred to a new owner by a replacement of the biometric module with a second biometric module including a second biometric profile of the new owner. In some embodiments, ownership of the IHS is transferred to a new owner by a destruction of the biometric profile, and a flash of a second biometric profile to an unused one-time write memory space of the biometric module.

In some embodiments, the IHS includes a data storage drive, where content of the data storage drive is encrypted with a key derived from the biometric profile. In some embodiments, the IHS further includes an encrypted data storage drive, where to allow access to the IHS based, at least in part, on the validation of the biometric data with the biometric profile, the program instructions further cause the IHS to: validate the obtained biometric data from the user against the biometric profile; release an encryption key for the encrypted data storage drive, where the encryption key was derived from the biometric profile; and use the encryption key to decrypt the data storage drive.

In some embodiments, the encrypted data storage drive includes a self-encrypting drive, where the encryption key includes either the internal drive encryption key or the access key of the self-encrypting drive. In some embodiments, the biometric profile includes one or more of: fingerprint data of the owner of the IHS; facial data of the owner of the IHS; voice data of the owner of the IHS; ocular data of the owner of the IHS; DNA sampling data of the owner of the IHS; or retina data of the owner of the IHS.

In another illustrative, non-limiting embodiment, a method includes: obtaining biometric data from a user of an Information Handling System (IHS); and allowing access to the IHS based, at least in part, on a validation of the biometric data with a biometric profile stored in a one-time write memory of the IHS.

In some embodiments, the one-time write memory includes a one-time flash memory, and the method further includes: writing, by a manufacturer of the IHS, the biometric profile to the one-time flash memory of the IHS. In some embodiments, the method further includes: obtaining owner biometric data from an owner of the IHS; and writing the biometric profile including the owner biometric data to the one-time write memory of the IHS before the owner takes possession of the IHS.

In some embodiments, the one-time write memory is included within a biometric module of the IHS, and the method further includes: replacing the biometric module with a second biometric module including a second biometric profile of a new owner; and transferring ownership of the IHS to the new owner. In some embodiments, the one-time write memory is included within a biometric module of the IHS, and the method further includes: destroying the biometric profile; flashing a second biometric profile of a new owner to an unused one-time write memory of the biometric module; and transferring ownership of the IHS to the new owner.

In another illustrative, non-limiting embodiment, one or more non-transitory computer-readable storage media store program instructions, that when executed on or across one or more processors, cause the one or more processors to: obtain biometric data from a user of an Information Handling System (IHS); and disallow access to the IHS based, at least in part, on an unsuccessful validation of the biometric data against a biometric profile stored in a one-time write memory of the one or more non-transitory computer-readable storage media.

In some embodiments, the biometric profile includes one or more of: fingerprint data of the owner of the IHS; facial data of the owner of the IHS; voice data of the owner of the IHS; ocular data of the owner of the IHS; DNA sampling data of the owner of the IHS; or retina data of the owner of the IHS. In some embodiments, the biometric profile is written, by a manufacturer of the IHS, to the one-time write memory of the one or more non-transitory computer-readable storage media prior to providing the IHS to an owner.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
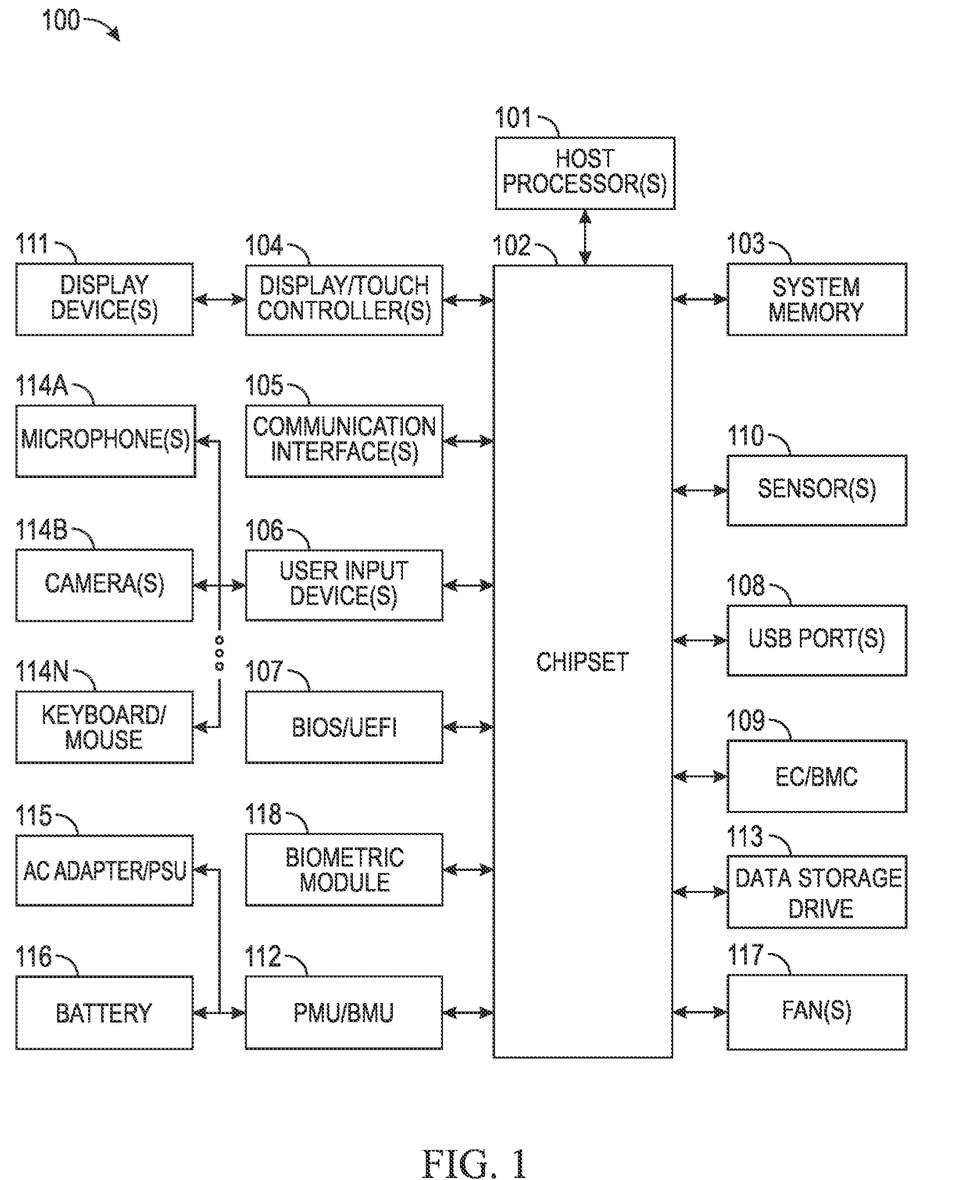
FIG. 1 is a block diagram of hardware components of an IHS, which may be used to implement the systems and methods for establishing biometric hardwired IHS ownership, according to some embodiments.

FIG. 1 is a block diagram of hardware components of IHS 100, which may be used to implement the systems and methods for establishing biometric hardwired IHS ownership, according to some embodiments.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more data storage drives 113, such as hard disk drives, solid-state drives, optical drives, or other removable-media drives 113.

In some embodiments, a data storage drive 113 can be a self-encrypting drive (SED). SEDs are hard disk drives, solid-state drives, optical drives, or other removable-media drives that transparently encrypt all on-disk data using an internal key and a drive access password, in some embodiments. SEDs can use an encryption key to secure the data stored on the disk. This encryption can protect a drive from data theft, for example, when a drive is removed from an array. If an SED drive's internal key or drive access password is lost, the drive data will be permanently inaccessible and the drive must be reset and reformatted in order to be repurposed, in some embodiments.

SED drives can be initially in a factory-fresh state, known as the unowned state, in some embodiments. In this state, no encryption keys exist on the drive or the IHS, and encryption is not enabled. A first initialization step can be to generate a randomized internal drive encryption key ("DEK") by using the drive's embedded encryption hardware, in some embodiments. This key can be used by the drive hardware to encrypt all incoming data before writing it to disk, and to decrypt any disk data being read by an IHS, in some of these embodiments.

A second step can be to generate a drive control key or drive access password, otherwise known as an access key ("AK"), in some embodiments. This password or AK can be used each time the drive is accessed by the IHS. Without the password, the drive can be completely inaccessible, in some embodiments. Once encryption has been set up, the SED drive can be in a secure, owned state and can be ready to be formatted, in some embodiments.

A SED drive can be cryptographically erased and reset to a factory-fresh state in two ways, in some embodiments. A first way is by performing a process that resets the DEK, and deletes the AK, thereby cryptographically erasing the drive. One such process can be called a release command, in some embodiments. Another such process in some embodiments, is called "smartfail." A second way to cryptographically erase an SED drive, and to reset to a factory-fresh state, can be to use a process that requires a physical security ID (PSID). This can be called a revert command, in some embodiments. A drive can be manually reverted to the unowned state by using its PSID. In some embodiments, the PSID can be a unique, static, 32-character key that is embedded in each drive at the factory. In other embodiments, the PSID can be of a different length or of different types of notation, and the description here should not be construed as limiting. The PSIDs can also be printed on the drive's label, and can be retrieved by physically removing the drive from an IHS and reading its label. After the PSID is entered, at the manual revert prompt for example, then all of the drive data is deleted and the SED drive is returned to an unowned state, in some embodiments.

The release command can require the drive password to run, whereas the revert command can require the drive's PSID. If the drive password is still known and functional, the IHS can release the drive after a smartfail process completes, or during an IHS reimage, without requiring manual intervention. If the drive password is lost or no longer functional, the revert command must be used instead, and the PSID must be entered manually.

Smartfail can cryptographically erase a functional SED drive. During the smartfail process, the DEK is reset and the AK is deleted, cryptographically erasing the drive. In a successful smartfail condition, changing the DEK cryptographically erases data, and deleting the AK blocks read/write access to existing data. After the smartfail process completes, the IHS deletes the drive access password from the keystore and the drive deletes its internal encryption key. As a result, the data is inaccessible and is considered cryptographically erased, and the drive is reset to the unowned state. The drive can then be reused after a new encryption key is generated, or provided to a third party, without any risk of the third party accessing the data.

If the SED drive is mishandled, such as interrupting the formatting process or removing the drive from a powered-on IHS, the IHS can delete its drive access password from the keystore database where the drive access passwords are stored. If the internal drive key or the drive access password or both are lost or deleted, all of the data on the drive can become permanently inaccessible and unreadable, in some embodiments. This process is seen as cryptographic erasure, as the data still exists, but cannot be decrypted. The drive can be subsequently unusable, unless it can be manually reverted to the unowned state.

If a drive is removed from a running IHS, the drive's operating system can assume that the drive has failed, and can initiate the smartfail process, in some embodiments. If the drive is reinserted before the smartfail process completes, a user can run certain commands, such as add and stopfail commands, to bring the drive back online and return it to a healthy state, in some embodiments. However, if the smartfail process has completed before a user reinserts the drive, and the user runs a stopfail command, the drive access password for the removed drive is deleted from the IHS's keystore, in some embodiments. If this occurs, the data on the drive can no longer be accessed and is considered cryptographically erased, in these embodiments.

If a drive is reinserted and/or added back to an IHS after it has been smartfailed, it will be displayed as being in the SED_ERROR state because the drive still contains encrypted data but the drive access password no longer exists in the IHS's keystore, in some embodiments. Although the data on the drive is inaccessible, a user can still revert the drive itself to an unowned state by using its PSID. Then a user can then reuse the drive.

Therefore, SEDs protect data at rest, in some embodiments. SED drives cannot be taken out of a system, put into another system, and have the cleartext taken off of the drives. An SED prevents the migration of data from one system to another system using the SED drives, without having the passwords.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS for use by IHS 100. BIOS 107 provides an abstraction layer that allows host OS to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

As part of or separate (depending on the embodiment) from the BIOS process of initializing and testing hardware components coupled to IHS 100, and loading the host OS for use by IHS 100, a biometric module 118 can provide a biometric profile during or after the boot phase of the IHS 100. The biometric module 118 can be hard-wired (e.g., pre-flashed) to a designated owner via previously created biometric profile, in some embodiments. Biometric ownership can be a one-time flash memory write to the biometric module 118 prior to shipping the IHS 100 to an owner, in some embodiments. A biometric profile of a designated user or owner can be hardwired to the biometric module 118 at the factory or shipping center prior to the shipping the IHS 100, in some embodiments. This means that only the designated user or owner can use the IHS 100, in these embodiments.

The biometric module 118 can operate such that the IHS cannot be used or even booted up without its pre-flashed owner, in some embodiments. The IHS 100 will bootup/unlock (even for the first time) only if biometric profile already exists in the biometric module 118, and only if it matches the user, in some embodiments. There is no bypass mechanism, in some of these embodiments. The biometric data in the biometric module 118 cannot be changed and is not transferrable outside of the device, in some embodiments. The biometric module 118 can operate as a read-only vault that is immutable and cannot be reprogrammed, in some embodiments.

The data storage drive 113 content can be encrypted with a private key derived from the biometric profile within the biometric module 118, in some embodiments. If the data storage drive 113 is an SED, either the SED's DEK, or the SED's AK, or both, can be derived from the biometric profile within the biometric module 118, depending on the embodiment. In case of supported ownership transfer, the old content is either destroyed or cryptographically erased, because it was encrypted with the previous key or keys.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
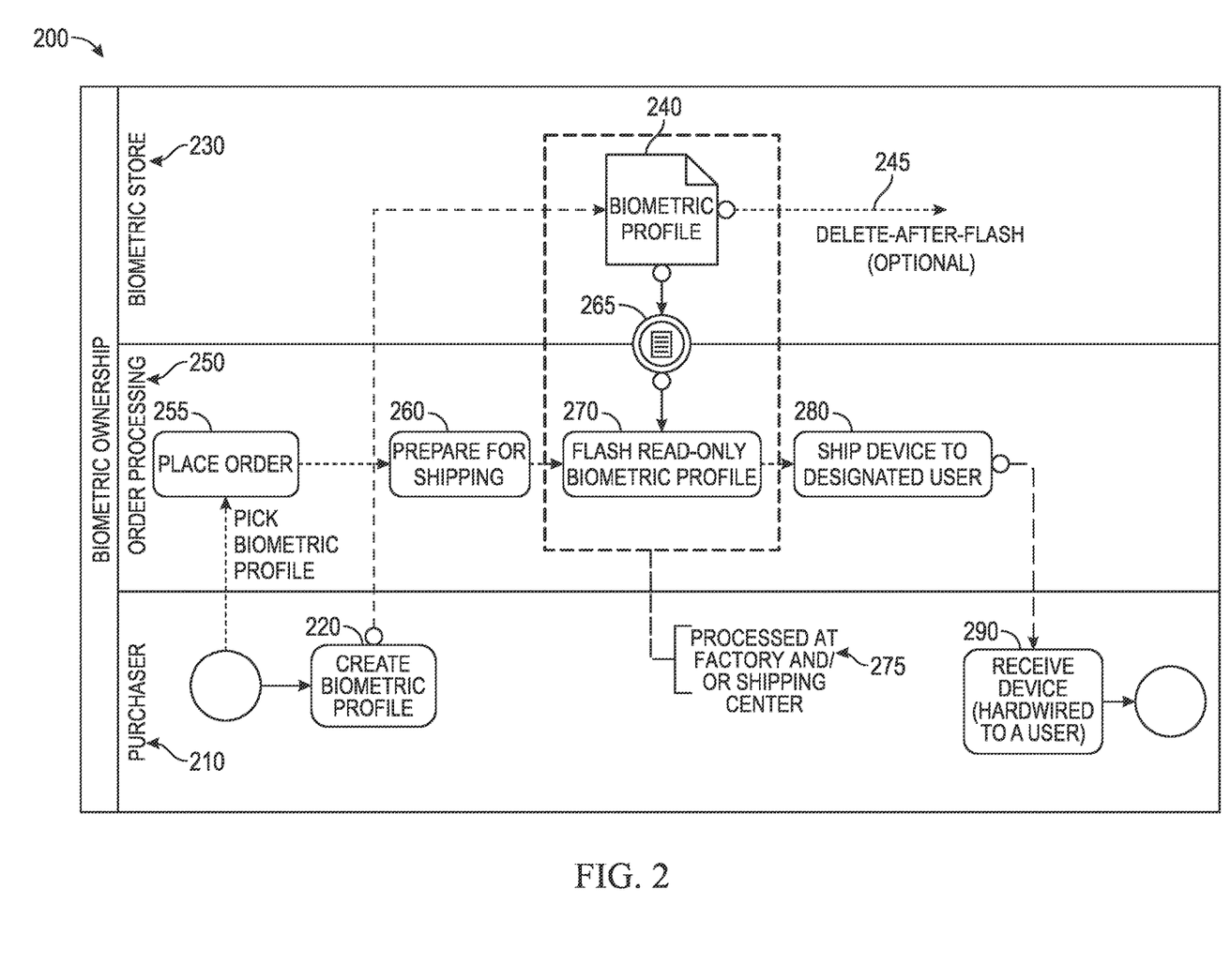
FIG. 2 is a flowchart illustrating an example purchasing process of an IHS that includes biometric hardwired device ownership for the IHS, according to some embodiments.

FIG. 2 is a flowchart illustrating an example purchasing process of an IHS that includes biometric hardwired device ownership for the IHS, according to some embodiments. In some embodiments, process 200 may be instantiated, at least in part, through the execution of program instructions stored in the BIOS 107, biometric module 118, and/or system memory 103, and executed by host processor(s) 101 of IHS 100.

Some embodiments of the present disclosure solve the problem of unauthorized users getting access to an IHS 100 and/or its contents. An IHS, such as a personal device, can be lost, stolen or misdelivered thus allowing unauthorized users to get access to the IHS and/or its content. Password-based authentication can be a weak link in the security chain. There is a need for non-transferrable IHSs. There is a need for IHSs that in hands of an unauthorized user is useless—e.g., IHSs for military, politicians, medical professionals, etc.

An IHS can be hard-wired (e.g., pre-flashed) to a designated owner via previously created biometric profile, in some embodiments. The biometric profile can be collected via special smart-phone program or alternative methods. The biometric profile can include one or more of: fingerprint data of the designated owner of the IHS; facial data of the designated owner of the IHS; voice data of the designated owner of the IHS; ocular data of the designated owner of the IHS; DNA sampling data of the designated owner of the IHS; and/or retina data of the designated owner of the IHS. The biometric profile can also include other types of biometric data, and the list above should not be construed as limiting.

Biometric ownership can be a one-time flash memory write to the biometric module 118 prior to shipping the IHS 100 to an owner, in some embodiments. A biometric profile of a designated user or owner can be hardwired to IHS (e.g., via the biometric module 118) at the factory or shipping center prior to the shipping the IHS 100, in some embodiments. This means that only the designated user or owner can use the IHS 100, in these embodiments. Allowing any first recipient to program biometrics does not protect against theft or mis-delivery before the IHS reaches the intended recipient. If, for example, an IHS is stolen while in transit, then an IHS that allows a first recipient to program biometrics will allow the IHS to work for non-intended methods.

Some embodiments of the present disclosure protects against theft or mis-delivery before the IHS reaches the intended recipient.

In some embodiments of the present disclosure, the IHS cannot be used or even booted up without its pre-flashed owner. The IHS 100 will bootup/unlock (even for the first time) only if biometric profile already exists in the biometric module 118, and only if it matches the user, in some embodiments. There is no bypass mechanism, in some of these embodiments. The biometric data cannot be changed and is not transferrable outside of the device, in some embodiments. The storage for the biometric data, such as for example a biometric module 118, can operate as a read-only vault that is immutable and cannot be reprogrammed, in some embodiments. Therefore, a main use case of some embodiments of the present disclosure is one owner for the lifetime of the IHS, with no shared access, and no easy ownership transfer.

In some embodiments, the content of the IHS is encrypted with a key derived from one-time flash biometric profile. The data storage drive 113 content, for example, can be encrypted with a private key derived from the biometric profile, in some embodiments. If the data storage drive 113 is an SED, either the SED's DEK, or the SED's AK, or both, can be derived from the biometric profile, depending on the embodiment. In case of supported ownership transfer, the old content is either destroyed or cryptographically erased, because it was encrypted with the previous key or keys.

FIG. 2 begins with an IHS purchaser 210 creating a biometric profile 220. A biometric data for a biometric profile can collected via special smart-phone program or via alternative methods, depending on the embodiment. The biometric profile 240 can be uploaded to a biometric store 230, such as a secure original equipment manufacturer ("OEM") storage area. The purchaser 210 can then place an order 255 for an IHS. The purchaser 210 can place such an order using an order processing 250 service or system. As part of placing the order 255, the purchaser 210 can pick a previously uploaded biometric profile 240 for the IHS. The order processing facility 250 can prepare the IHS for shipping 260.

The order processing facility, such as for example the IHS factory and/or shipping center 275, can obtain the appropriate biometric profile 265. The order processing facility (e.g., the IHS factory and/or shipping center 275) can write 270 a one-time write memory with the biometric profile 265 such that the biometric profile becomes a read-only biometric profile, in some embodiments. In some embodiments, the one-time write memory can be a flash memory, such that the order processing facility flashes 270 the biometric profile to the flash memory. The biometric profile can then become a read-only biometric profile, in some embodiments.

After the use of the biometric profile 240, the biometric store can optionally delete 245 the biometric profile after the use. In some embodiments, the biometric profile 240 can be deleted 245 after it is flashed to the flash memory. In some embodiments, whether the biometric profile is deleted can be an option that is selected by the purchaser 210.

The order processing facility 250 can then ship 280 the IHS to a designated user (e.g., the purchaser 210). The designated user (e.g., the purchaser 210) can receive 290 the IHS that is hardwired to the designated user, in some embodiments.

In some embodiments, a purchaser 210 can purchase an IHS for someone else, i.e., for a different designated user. However, in some of these embodiments, a purchaser can only make such a purchase if the different designated user's biometric profile is available. The different designated user's biometric profile might already be available in the purchaser's account, in some embodiments. In other embodiments, the purchaser might upload the different designated user's biometric profile to the biometric store 230 as part of the purchasing process.

As an example, a purchaser might decide to buy an IHS for a different designated user. As part of the purchasing process, the purchaser could specify the different designated user's email address as the IHS's dedicated owner. The purchasing system can then send to the different designated user (e.g., to the email address of the different designated user) a link to download a bio-profile mobile application, in some embodiments. The notification (e.g., email message) might also include an invitation and/or a custom message from the purchaser, in some embodiments. The different designated user can register his/her biometric profile via the bio-profile mobile application using his/her smart phone's biometric capability. The different designated user can be offered to select a "Delete profile after flashing" option, in some embodiments.

The purchaser might then get a notification and/or confirmation that the different designated user's biometric profile is ready, in some embodiments. The purchaser can decide to include some additional content (e.g., a family album) for the different designated user's new IHS. Prior to shipping, the "Designated IHS" can be one-time flashed with the different designated user's biometric profile, in some embodiments. Additional content can be added and encrypted with a key derived from her biometric profile, in some embodiments. The different designated user's biometric profile can be deleted by the biometric store upon successful flashing to the IHS, in some embodiments. The IHS can then be shipped to the different designated user, in some embodiments.

Upon receiving the IHS, the different designated user can boot it up since the IHS recognizes the different designated user's biometric profile. Upon logon, the different designated user can access additional content that the purchaser supplied at the time of purchase.

In some embodiments, if the IHS gets lost or stolen during shipping or later, then no one can boot it up because the biometric profile does not match. In some of these embodiments where the IHS is lost or stolen, the IHS becomes unusable and/or inoperable. In some embodiments, the IHS gets lost or stolen during shipping or later, then no one can access any content stored on the data storage drive (including the custom content the purchaser uploaded), in some embodiments. In some of these embodiments, the content can be encrypted with one or more keys derived from the biometric profile.

Some embodiments of the present disclosure provide for no ownership transfer options. Once an IHS is associated with a biometric profile, then only a designated user with that biometric profile can use the IHS. However, in other embodiments, ownership transfer can be possible. In some embodiments, ownership transfer can occur at designated OEM service center, or other service center. Such a service center can physically replace the biometric module with another biometric module, in some embodiments. Ownership of the IHS can be transferred to a new owner by a replacement of the biometric module with a second biometric module including a second biometric profile of the new owner. However, upon replacement of the biometric module with a second biometric module, the previous content on the data storage drive(s) of the IHS remains inaccessible due to a different encryption key derived from the biometric profile, in some embodiments. In this case, the data storage drive(s) of the previous owner would be cryptographically erased, according to these embodiments.

In other embodiments, a service center can transfer ownership of an IHS via flashing a new biometric profile to an unused portion of one-time write memory, and destroying the previous biometric profile. Ownership of the IHS can be transferred to a new owner by a destruction of the biometric profile, and a flashing of a second biometric profile to an unused one-time write memory space of the biometric module, in some embodiments.

In some embodiments, upon failed verification of a user's biometric data against the biometric profile stored in the one-time write memory, the IHS 100 may be configured to erase all data and/or encrypted data. The IHS can do this by cryptographically erasing the data of an SED drive, for example. Once the data is erased, then, in some embodiments, the IHS 100 may be used without biometric features (or, in some embodiments, with another biometric profile stored in a re-writable memory, for example).

Figure 3:
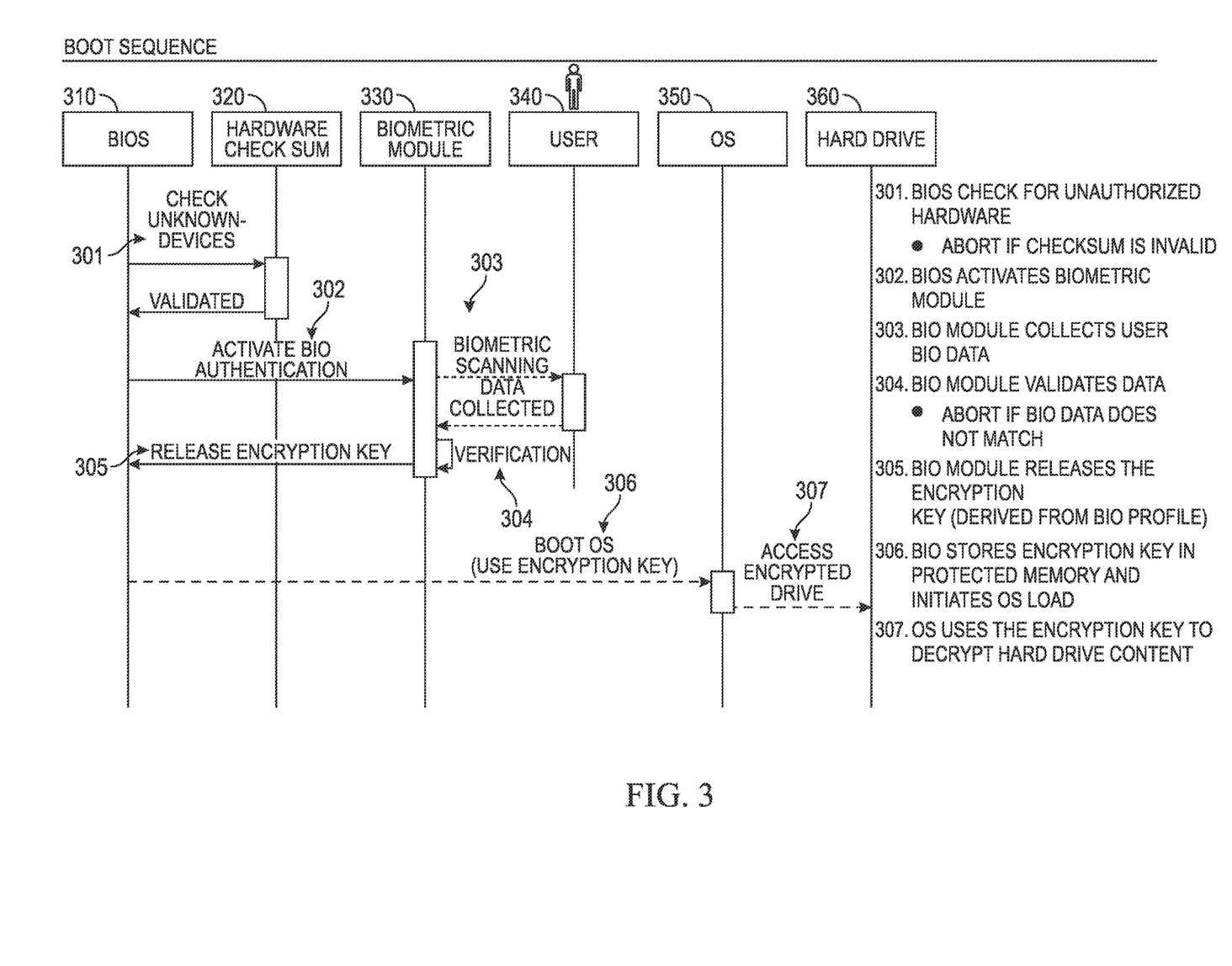
FIG. 3 is a flowchart illustrating an example of boot sequence diagram of an IHS that includes biometric hardwired device ownership for the IHS, according to some embodiments.

FIG. 3 is a flowchart illustrating an example of boot sequence diagram of an IHS that includes biometric hardwired device ownership for the IHS, according to some embodiments. In some embodiments, the steps of the flowchart of FIG. 3 may be performed, at least in part, by operation of IHS 100.

The boot sequence of FIG. 3 begins with a BIOS 310 checking for unknown devices and/or checking for unauthorized hardware 301. The BIOS 310 can perform this checking via the use of a hardware checksum 320. The BIOS 310 can abort if this hardware checksum 320 is invalid, in some embodiments. If the hardware checksum is validated, however, then the BIOS 310 can activate 302 bio authentication of the biometric module 330.

The biometric module 330 can collect 303 biometric data from a user 340. This can include the biometric module 330 biometric scanning 303 the user 340, and/or receiving data collected from the user 340, in some embodiments. The biometric module 330 can validate 304 and/or perform a verification of the biometric data, in some embodiments. If the biometric data does not match the stored biometric data of the biometric module, then the biometric module can abort, in some embodiments.

If the biometric data does match the stored biometric data, then the biometric module 330 can then release 305 to the BIOS 310 the encryption key, in some embodiments. The encryption key was derived from biometric profile, in some embodiments. The BIOS 310 can store the encryption key in a protected memory space, in some embodiments. The BIOS 310 can then initiate 306 or boot the operating system ("OS") 350. The BIOS 310 and use the encryption key to boot the OS, in some embodiments. The BIOS 310 can specify to the OS 350 the location of the encryption key within the protected memory space, in some embodiments. The OS 350 can use the encryption key to decrypt 307 contents of the hard drive 360 and/or access 307 the encrypted hard drive 360, in some embodiments.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method, comprising:
   obtaining biometric data from a user of an Information Handling System (IHS);
   allowing access to the IHS based, at least in part, on a validation of the biometric data with a biometric profile stored in a one-time write memory of the IHS, wherein the one-time write memory is comprised within a biometric module of the IHS;
   replacing the biometric module with a second biometric module comprising a second biometric profile of a new owner; and
   transferring ownership of the IHS to the new owner.

2. The method of claim 1, wherein the one-time write memory comprises a one-time flash memory, the method further comprising:
   writing, by a manufacturer of the IHS, the biometric profile from the allowing step to the one-time flash memory of the IHS.

3. The method of claim 1, wherein the user of the IHS is an original owner of the IHS, and wherein the biometric data from the obtaining step is the original owner's biometric data, the method further comprising:
   writing the biometric profile comprising the original owner's biometric data to the one-time write memory before the original owner takes possession of the IHS.

4. The method of claim 1, wherein the second biometric profile and the biometric profile from the allowing step each comprise one or more of: fingerprint data; facial data; voice data; ocular data; DNA sampling data; or retina data.

5. The method of claim 1, wherein the one-time write memory comprises a one-time flash memory.

6. The method of claim 3, wherein the writing step is performed by a manufacturer of the IHS.

7. A method, comprising:
   obtaining biometric data from a user of an Information Handling System (IHS);
   allowing access to the IHS based, at least in part, on a validation of the biometric data with a biometric profile stored in a one-time write memory of the IHS, wherein the one-time write memory is comprised within a biometric module of the IHS;
   destroying the biometric profile;
   flashing a second biometric profile of a new owner to an unused one-time write memory space of the biometric module; and
   transferring ownership of the IHS to the new owner.

8. The method of claim 7, wherein the one-time write memory comprises a one-time flash memory, the method further comprising:
   writing, by a manufacturer of the IHS, the biometric profile from the allowing step to the one-time flash memory.

9. The method of claim 7, wherein the user of the IHS is an original owner of the IHS, and wherein the biometric data from the obtaining step is the original owner's biometric data, the method further comprising:
   writing the biometric profile comprising the original owner's biometric data to the one-time write memory before the original owner takes possession of the IHS.

10. The method of claim 7, wherein the second biometric profile and the biometric profile from the allowing step each comprise one or more of: fingerprint data; facial data; voice data; ocular data; DNA sampling data; or retina data.

11. The method of claim 7, wherein the one-time write memory comprises a one-time flash memory.

12. The method of claim 9, wherein the writing step is performed by a manufacturer of the IHS.

* * * * *